(12) United States Patent
Cole

(10) Patent No.: US 9,272,346 B2
(45) Date of Patent: Mar. 1, 2016

(54) PORTABLE FOAM PANEL CUTTING MACHINE

(71) Applicant: Systeco (Cayman) Ltd SECZ, Springfield, MO (US)

(72) Inventor: Kenneth R. Cole, Cassville, MO (US)

(73) Assignee: SYSTECO (CAYMAN) LTD SECZ, Springfield, MI (US)

( * ) Notice: Subject to any disclaimer, the term of this patent is extended or adjusted under 35 U.S.C. 154(b) by 0 days.

(21) Appl. No.: 14/447,981

(22) Filed: Jul. 31, 2014

(65) Prior Publication Data

US 2014/0338514 A1 Nov. 20, 2014

Related U.S. Application Data

(63) Continuation of application No. 13/782,308, filed on Mar. 1, 2013, now Pat. No. 8,904,644, which is a continuation-in-part of application No. 12/218,678, filed on Jul. 17, 2008, now Pat. No. 8,397,387.

(60) Provisional application No. 61/762,397, filed on Feb. 8, 2013.

(51) Int. Cl.
*B26D 3/00* (2006.01)
*B26D 1/00* (2006.01)
*B26D 7/10* (2006.01)
(Continued)

(52) U.S. Cl.
CPC ............. *B23D 49/00* (2013.01); *B26D 1/0006* (2013.01); *B26D 3/008* (2013.01); *B26D 3/10* (2013.01); *B26D 7/10* (2013.01); *B26F 3/08* (2013.01); *B26D 2001/0053* (2013.01); *Y10T 29/49629* (2015.01); *Y10T 29/49995* (2015.01); *Y10T 29/49996* (2015.01); *Y10T 29/5138* (2015.01); *Y10T 83/0304* (2015.04); *Y10T 83/04* (2015.04); *Y10T 83/293* (2015.04); *Y10T 83/664* (2015.04)

(58) Field of Classification Search
CPC ........ B23D 49/00; B26D 7/10; B26D 1/0006; B26D 3/10; B26D 3/008; B26D 2001/0053; B26F 3/08; Y10T 29/5138; Y10T 29/49996; Y10T 29/49995; Y10T 83/664; Y10T 83/04; Y10T 83/293; Y10T 83/0304; Y10T 29/49629
See application file for complete search history.

(56) References Cited

U.S. PATENT DOCUMENTS 3,373,065 A 3/1968 Gutzman et al.
3,526,750 A 9/1970 Siegel
(Continued)

FOREIGN PATENT DOCUMENTS

GB 805836 12/1958
WO 2005056254 A1 6/2005

*Primary Examiner* — John C Hong
(74) *Attorney, Agent, or Firm* — Husch Blackwell LLP

(57) ABSTRACT

A foam panel cutting machine for cutting foam panels used in insulated building panels. The foam panel cutting machine has a feeder system feeds the foam panel through the cutting blades. The cutting machine additionally includes a frame, a plurality of upper rollers and a plurality of lower rollers rotationally mounted to the frame. The foam panel cutting machine can be constructed so that it may be portable. One embodiment includes the upper rollers on an adjustable head that can adjust the gap distance between the upper and lower rollers so that foam panels of various thicknesses may be cut. The cutting blade may be a hot-knife wherein the blade is heated by passing an electrical current through it. The cutting blade may have a "L" or "J" shape to cut kerfs into the foam panel that receive metal studs to form an insulated building panel.

2 Claims, 8 Drawing Sheets

(51) Int. Cl.
*B26D 3/10* (2006.01)
*B23D 49/00* (2006.01)
*B26F 3/08* (2006.01)

(56) References Cited

U.S. PATENT DOCUMENTS

| | | |
|---|---|---|
| 3,757,617 A | 9/1973 | Fabbri |
| 3,901,110 A | 8/1975 | Priestly |
| 3,994,065 A | 11/1976 | Plum |
| 4,070,013 A | 1/1978 | Sickler |
| 4,221,148 A | 9/1980 | Lewis |
| 4,288,271 A | 9/1981 | Campbell, Jr. et al. |
| 4,385,090 A | 5/1983 | Sims |
| 4,596,066 A | 6/1986 | Inoue |
| 4,608,103 A | 8/1986 | Aldrich |
| 4,608,893 A | 9/1986 | Hühne |
| 4,641,469 A | 2/1987 | Wood |
| 4,675,825 A | 6/1987 | DeMenthon |
| 4,699,032 A | 10/1987 | Clark, III |
| 4,823,534 A | 4/1989 | Hebinck |
| 4,892,018 A | 1/1990 | Boggs |
| 4,952,450 A | 8/1990 | Noel |
| 5,072,569 A | 12/1991 | VanTassel |
| 5,172,532 A | 12/1992 | Gibbar, Jr. |
| 5,323,573 A | 6/1994 | Bakewell, III |
| 5,353,560 A | 10/1994 | Heydon |
| 5,487,248 A | 1/1996 | Artzer |
| 5,505,031 A | 4/1996 | Heydon |
| 5,617,686 A | 4/1997 | Gallagher, Jr. |
| 5,653,032 A | 8/1997 | Sikka |
| 5,765,333 A | 6/1998 | Cunningham |
| 5,771,645 A | 6/1998 | Porter |
| 5,818,718 A | 10/1998 | Thomas et al. |
| 5,822,940 A | 10/1998 | Carlin et al. |
| 5,842,276 A | 12/1998 | Asher et al. |
| 5,943,775 A | 8/1999 | Lanahan et al. |
| 5,965,207 A | 10/1999 | Kropfeld et al. |
| 6,018,922 A | 2/2000 | McKinnon |
| 6,142,053 A | 11/2000 | Denney et al. |
| 6,167,624 B1 | 1/2001 | Lanahan et al. |
| 6,251,319 B1 | 6/2001 | Tusim et al. |
| 6,253,523 B1 | 7/2001 | McKinnon |
| 6,272,749 B1 | 8/2001 | Boeshart et al. |
| D450,729 S | 11/2001 | Welsh |
| 6,358,344 B1 | 3/2002 | Hunter, Jr. |
| 6,412,243 B1 | 7/2002 | Sutelan |
| 6,416,854 B2 | 7/2002 | Hunter, Jr. |
| 6,571,523 B2 | 6/2003 | Chambers |
| 6,581,348 B2 | 6/2003 | Hunter, Jr. |
| 6,627,030 B2 | 9/2003 | Yang et al. |
| 6,702,918 B2 | 3/2004 | Yang et al. |
| 6,722,611 B1 | 4/2004 | Wu et al. |
| 6,725,616 B1 | 4/2004 | Pease |
| 6,892,507 B1 | 5/2005 | Pease |
| 6,945,002 B2 | 9/2005 | Zambelli et al. |
| 6,970,765 B1 | 11/2005 | Greene |
| 7,028,440 B2 | 4/2006 | Brisson |
| 7,127,856 B2 | 10/2006 | Hagen, Jr. et. al. |
| 7,162,847 B2 | 1/2007 | Gigiakos |
| 7,168,216 B2 | 1/2007 | Hagen, Jr. |
| D554,673 S | 11/2007 | Cheng |
| 7,555,976 B2 | 7/2009 | Logan et al. |
| 2002/0061497 A1 | 5/2002 | Boudreaux et al. |
| 2002/0184846 A1 | 12/2002 | Crowder |
| 2004/0107652 A1 | 6/2004 | Elliott |
| 2004/0128932 A1 | 7/2004 | Estape |
| 2004/0188031 A1 | 9/2004 | Barman et al. |
| 2006/0065152 A1 | 3/2006 | Heitmeyer et al. |
| 2007/0119118 A1 | 5/2007 | Gigiakos |
| 2011/0036219 A1 | 2/2011 | Finnell |

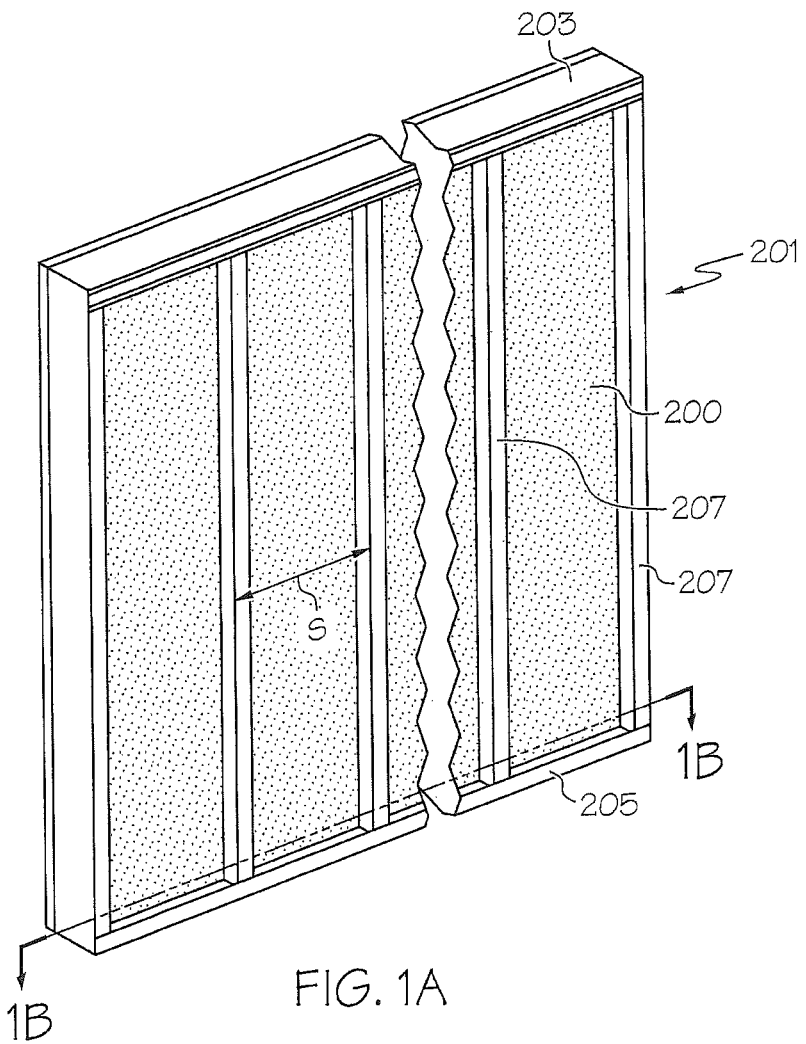
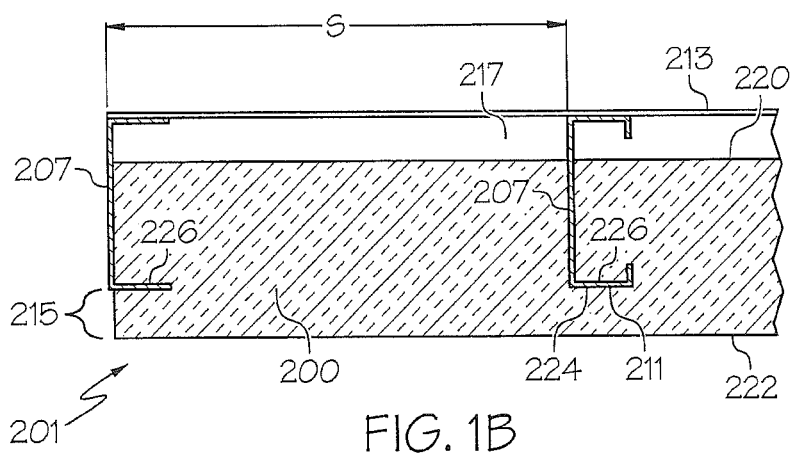
FIG. 1A
FIG. 1B

PORTABLE FOAM PANEL CUTTING MACHINE

CROSS-REFERENCE TO RELATED APPLICATION

This Application is a Continuation of and claims priority to U.S. application Ser. No. 13/782,308 filed Mar. 1, 2013 to Kenneth R. Cole entitled "Portable Foam Panel Cutting Machine,", which is a Continuation-in-Part of and claims priority to U.S. patent application Ser. No. 12/218,678, filed Jul. 17, 2008, to Kenneth R. Cole, et al. entitled "Automated Foam Panel Apparatus, Blade, and Associated Method," now U.S. Pat. No. 8,397,387 issued Mar. 19, 2013. This Application further claims priority to U.S. Provisional Patent Application No. 61/762,397, filed Feb. 8, 2013, to Kenneth R. Cole, entitled "Portable Foam Cutting Machine,". The entire disclosures, including the specifications and drawings, of all above-referenced applications are incorporated herein by reference.

FIELD OF THE INVENTION

The present invention relates to a device for cutting profiles for metal studs into a foam panel, such foam including expanded polystyrene (EPS) or other foam material to be used in insulated building panels.

BACKGROUND OF THE INVENTION

Devices utilizing hot-wire cutting machines to cut the stud profiles in to foam panels are known. The processes undertaken by these machines are expensive and not accurate because the hot wire process invites the cutting wire to wander or sag, creating assembly difficulties because the cuts are not straight and, therefore, a straight metal stud has a difficult time sliding into the profile cut. Thus, there is a need in the art for a cutting device that would cut stud profiles with both accuracy and efficiency.

U.S. patent application Ser. No. 12/218,678 sets forth a foam panel cutting, machine that cuts a profile of a metal stud into a foam panel by placing the foam panel on a stationary platform wherein the machine includes the cutting members being disposed on a moveable head. The moveable cutting head moves over or under the foam panels to cut the slots, also known as kerfs. This configuration, however, necessarily limits a length of a foam panel that can be utilized due to limitations in the movement of the head and the size of the supporting platform. Thus, there is a need in the art for a cutting machine that is configured to cut metal stud profiles in foam panels of variable lengths.

Further, a cutting machine having the foam panel being stationary on the machine's platform and the cutting members being on a moveable head that moves along the length of the foam panel necessitates a centralized manufacturing facility. The size of the fixed platform and the controls and guide system required to accurately cut metal stud profiles into the foam panel requires a large enclosed area. Further, this configuration greatly reduces the ability to adapt the length or configuration of manufactured sheets due to the conditions on a job-site. Accordingly, the large machine required for cutting foam panels on a stationary platform ultimately reduces the ability to utilize insulated structural panels in remote areas or other areas that are a sufficient distance from a manufacturing facility due to shipping limitations and costs associated therewith and also prevents modification of panels on-site to adapt to any issues that may occur during installation. Thus, there is a need in the art for a metal stud profile cutting machine that is portable and may be taken to a job site in order to assemble the insulated building panels on-site.

Moreover, a stationary cutting machine is less efficient because the foam panel has to be moved to another machine for the insertion of the metal studs into the foam panel after cutting the kerfs in order to assemble the insulated building panel. Thus, there was also a need in the art for a cutting machine that may be integrated into a continuous panel production line that simultaneously cuts the EPS panel and inserts the necessary length of metal stud to form the insulated building panels.

SUMMARY OF THE INVENTION

The device of the present invention is adapted for cutting slots into foam panels, sheets or boards, wherein such foam may include expanded polystyrene (EPS) or other suitable material. The slots cut by the present cutting machine are sized and shaped to receive at least a portion of a conventional metal stud. The slots are also called kerfs herein. In one embodiment, the slots are cut into EPS foam panels using heated "J" or "L"-shaped blades. Once the slots are cut into the foam panels, the metal studs may be inserted into the slots/kerfs.

The machine of the present invention includes a stationary arrangement of hot knives. The foam panels are fed into the present machine, where the blades of the hot knives cut "J"-shaped or "L"-shaped slots into the foam panels as they pass through the present machine. In other words, the blades are stationary during the cutting and the foam panels move through the blades. This is particularly advantageous over the previous machines because it does not limit the length of the foam panel that can be cut or the length of the building panel being constructed. Therefore, unlike with previous machines, very long foam panels (including boards of infinite length, theoretically) may be utilized. Additionally, the cutting machine of the present invention may include hot knives or blades that are configured and operable to cut door jambs and window jambs into the foam panels.

The overall configuration of the present cutting machine may include one or more of (a) a stationary, stand-alone cutting unit, (b) at least one upper and/or lower roller which guide the panel through the cutting unit and may or may not be driven using a drive system, and (c) entry and/or exit feeder platforms adjacent the entrance and exit of the cutting unit. The feeder platforms may comprise rollers, conveyor belts or the like. The feeder platform rollers and conveyors may be driven or non-driven. The feeder platforms may be detachable from the cutting unit during transportation and storage. The feeder platforms may additionally be broken down and/or folded up so that the cutting machine can be transferred or stored as a compact unit and easily moved from job site to job site.

Other and further objects of the invention, together with the features of novelty appurtenant thereto, will appear in the course of the following description.

BRIEF DESCRIPTION OF THE SEVERAL VIEWS OF THE DRAWINGS

The accompanying drawings form a part of the specification and are to be read in conjunction therewith, in which like reference numerals are employed to indicate like or similar parts in the various views.

FIG. 1A is a side perspective view of an insulated building panel including a foam panel cut using the cutting machine of the present invention;

FIG. 1B is a partial section view of the insulated building panel of FIG. 1A taken generally along the line 1B-1B in the direction of the arrows showing the construction of the insulated building panel, the shape of the metal studs, the thermal barrier, and the utility runs;

DETAILED DESCRIPTION OF THE INVENTION

Figure 2:
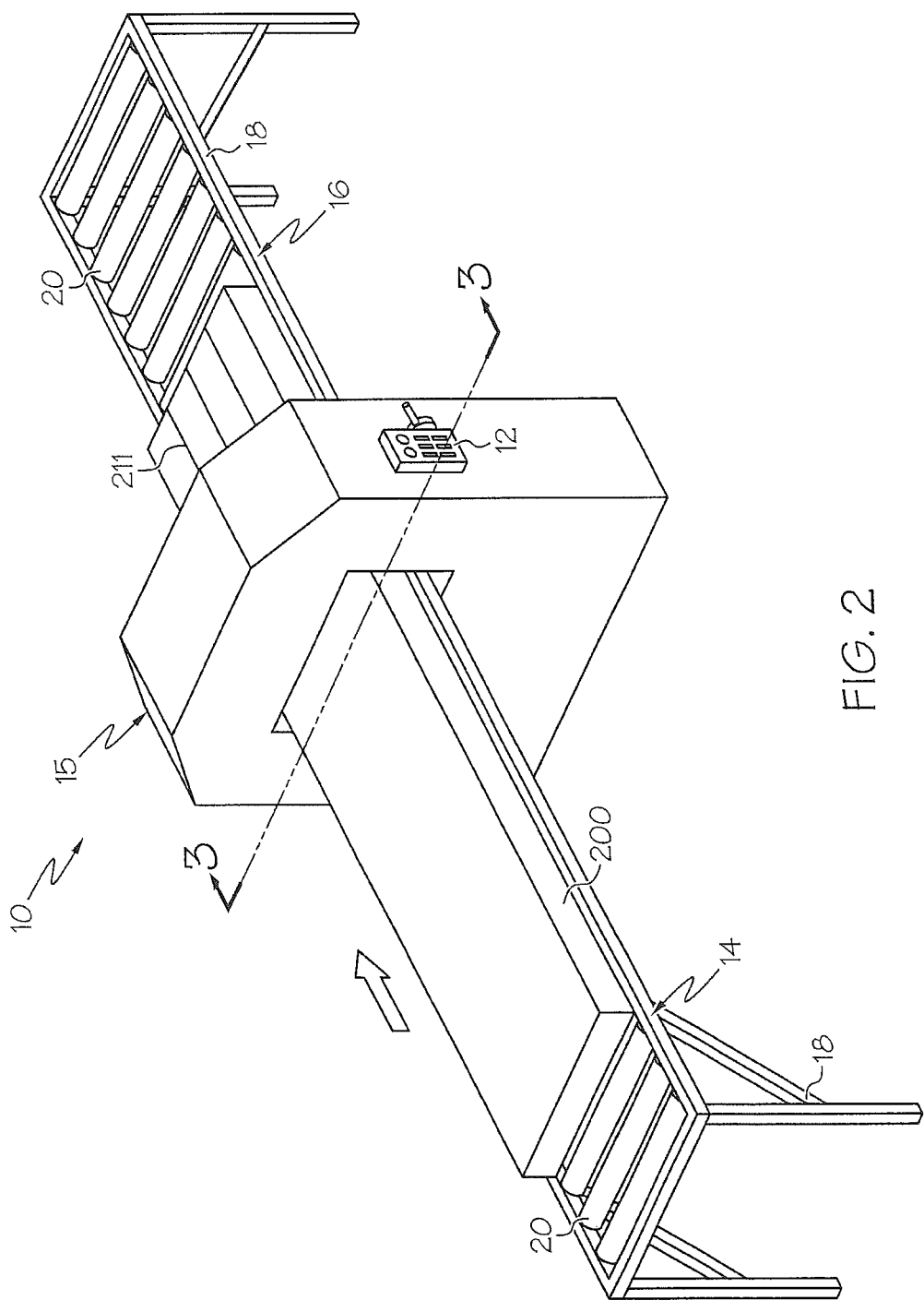
FIG. 2 is a perspective view of a foam panel cutting machine including a cutting unit, an entry feeder platform and an exit platform in accordance with one embodiment of the present invention.

The following detailed description of the present invention references the accompanying drawing figures that illustrate specific embodiments in which the invention can be practiced. The embodiments are intended to describe aspects of the present invention in sufficient detail to enable those skilled in the art to practice the invention. Other embodiments can be utilized and changes can be made without departing from the spirit and scope of the present invention. The present invention is defined by the appended claims and, therefore, the description is not to be taken in a limiting sense and shall not limit the scope of equivalents to which such claims are entitled.

In addition to the teachings below, the description of the present cutting machine hereby incorporates the disclosures of U.S. patent application Ser. No. 12/218,678 and U.S. Provisional Patent Application No. 61/762,397, the entireties of which are hereby incorporated by reference, including all figures and drawings thereof. The present cutting machine 10 provides an apparatus and method for constructing prefabricated insulated building panels 201 for use in commercial and residential building construction. Insulating building panels 201 may be structural or may simply be partition walls. As shown in FIGS. 1A and 1B, building panel 201 has four main components: foam panel 200, top frame 203, bottom frame 205, and one or more metal studs 207 separated at a spacing "S." A metal stud 207 is inserted into a kerf 211 found in the foam panel 200, such kerfs 211 have a substantially similar cross-sectional shape to match the profile of the metal studs 207. In particular, kerfs 211 may include a width 224 to match the width of the flange 226 of metal stud 207. Foam panel 200 has an interior surface 220 and an exterior surface 222 and may be formed of any insulating foam now known or hereafter developed. One common foam type used for this purpose is EPS. Top frame 203 and bottom frame 205 are secured to metal studs 207 using well known fasteners to form a strong, lightweight, insulated building panel 201. In one embodiment, the uncut portion of foam panel 200 forms the exterior surface of building panel 201 and creates an uninterrupted thermal barrier. The interior of building panel 201 may be wallboard 213 or other like material such as drywall, fiberboard, or plywood, which can be attached to studs 207 on the building site according to the specific architectural design of the building. In order to meet building codes of most locations, studs 207 must be recessed from the exterior surface 222 of foam panel 200 by a minimum predetermined depth 215 to form an uninterrupted thermal barrier. In some applications, the attachment of wallboard 213 to studs 207 creates a hollow cavity 217 in which conduit (not pictured) or other in-wall utilities such as electrical and plumbing lines and outlets may be installed. Alternatively, the foam panel 200 may extend to the interior flange of metal stud 207 leaving no cavity between the wall board 213 and the foam panel 200. In this case, pathways may be cut into the foam panel 200 for installation of the in-wall utilities.

FIG. 2 illustrates the general configuration of the foam profile cutting machine 10 of the present invention including a control panel 12, an entry feeder platform 14, a cutting unit 15 and an exit support platform 16 that support a foam panel 200 being fed through cutting machine 10 to cut kerfs 211 and, in some cases, other openings in a foam panel 200 as a step in forming insulated building panel 201 (shown in FIGS. 1A and 1B). Support platforms 14 and 16 each comprise a frame 18 that can support a plurality of rollers 20. Platforms 14 and/or 16 may be detachable from cutting unit 15, and may be foldable or otherwise disassembled for transport or storage. Entry feeder platform 14 may be removably coupled on an entry side of cutting unit 15 and exit support platform 16 may be removably coupled to an exit side of cutting unit 15.

Figure 3:
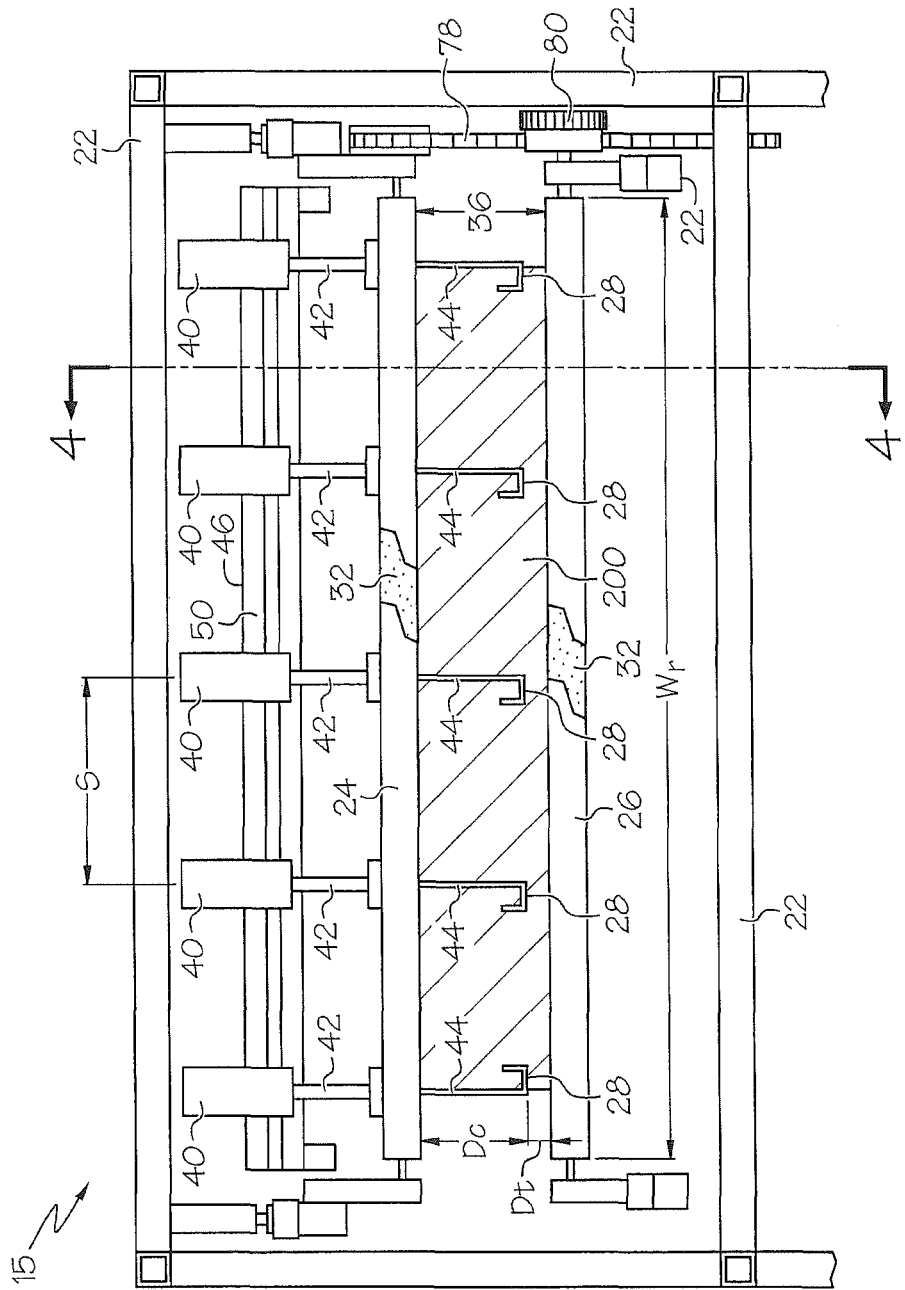
FIG. 3 is a partial section view of the cutting machine of FIG. 2 taken generally along the line 3-3 in the direction of the arrows.

FIG. 3 shows an embodiment of cutting machine 10 wherein the cutting unit 15 includes a machine frame 22, at least one upper feed roller 24, at least one lower feed roller 26, and a plurality of hot knives 28. In one embodiment, tubular steel machine frame 22 supports both lower feed rollers 26 and upper feed rollers 24, wherein the rollers 24 and 26 are journaled for rotation or otherwise supported for free rotation about their respective longitudinal axes. An embodiment of cutting unit 15 may include a series of upper and lower feed rollers 24 and 26 to support the top and bottom surface of foam panel 200 as it passes through the machine to accurately and straightly cut slot/kerf 211. Foam panel 200 may be fed through cutting unit 15 by one or more rollers 24 or 26 that are driven by a drive system 30 wherein FIG. 3 shows drive chains 78 and 80 of drive system 30 (described in more detail below and shown in FIG. 7). In one embodiment, cutting unit 15 may include alignment guides which provide lateral alignment of foam panel in cutting unit 15 and keep foam panel 200 aligned while moving through cutting unit 15. The alignment guides may extend the entire length of cutting unit 15, or may extend another length determined to be sufficient for maintaining the orientation of foam panel 200 in cutting machine 15. In one embodiment, the alignment guides are around two and one-half feet long. The alignment guides may be adjustable laterally in width to accommodate foam panels of various widths. One or more rollers may be urethane covered. In one embodiment, one or more rollers are driven by drive system 30 and are also be textured or have a tacky surface 32 to provide a gripping surface to grip foam panel 200 while feeding foam panel 200 through cutting unit 15. One embodiment includes the steel frame 22, rollers 24 and 26, drive system 30, and roller platforms 14 and 16 being configured to be modular and/or portable for on-site panel construction.

In one embodiment, upper feed rollers 24 are operably connected to adjustable head 34 wherein adjustable head 34 is moveably mounted to frame 22 so that the gap distance 36 between upper and lower rollers 24 and 26 is adjustable. Gap distance 36 may be set to match the thickness of the foam panel so that the foam panel will be supported on the top and the bottom to provide accurate cuts for the insertion of metal studs 207. For example, cutting unit 15 may provide a gap distance 36 between about three (3) inches or less to about twelve (12) inches or more, with one embodiment allowing adjustment of the gap 36 between the feed rollers 24 and 26 between about four (4) inches to about five (5) inches for use with a nominal 2"×4" metal stud (actual dimension 1½"× 3½"). Cutting unit 15 of cutting machine 10 may be adjustable to facilitate manufacturing an insulated wall panel 201 corresponding to any known nominal thickness of foam panel 200 which may correspond to common wall thicknesses. For example, standard construction uses four (4) inch, six (6) inch, eight (8) inch, ten (10) inch, and twelve (12) inch nominal structural wall members and trim materials are already manufactured to match these nominal widths. The width "$w_r$" of the upper and lower feed rollers 24 and 26 is the same or slightly wider than the nominal width of the foam panel 200 to be incorporated into structural panel 201. However, any width $w_r$ of rollers 24 and 26 is within the scope of the present invention. Foam panel 200 may be standard construction sheathing dimensions, of four (4) feet or eight (8) feet, a width that corresponds to standard wall stud spacing of twelve (12) inches, sixteen (16) inches, or twenty-four (24) inches, though cutting machine 10 is capable to cut slots/kerfs 211 at any other spacing S specified.

One or more of the upper feed rollers 24 and lower feed rollers 26 may be operably rotated by a drive system 30. Adjustable head 34 may be connected to frame 22 with an adjustment mechanism 38, for example a hydraulic or pneumatic actuator 38 as shown in FIG. 3. Another embodiment (not shown) uses a rack configuration with an adjustment crank that can be used to raise and lower the adjustable head 34. Further, any other mechanical method for raising and lowering adjustable head 34 and upper rollers 24 with respect to lower rollers 26 now known or hereafter developed is within the scope of the present invention.

Figure 4:
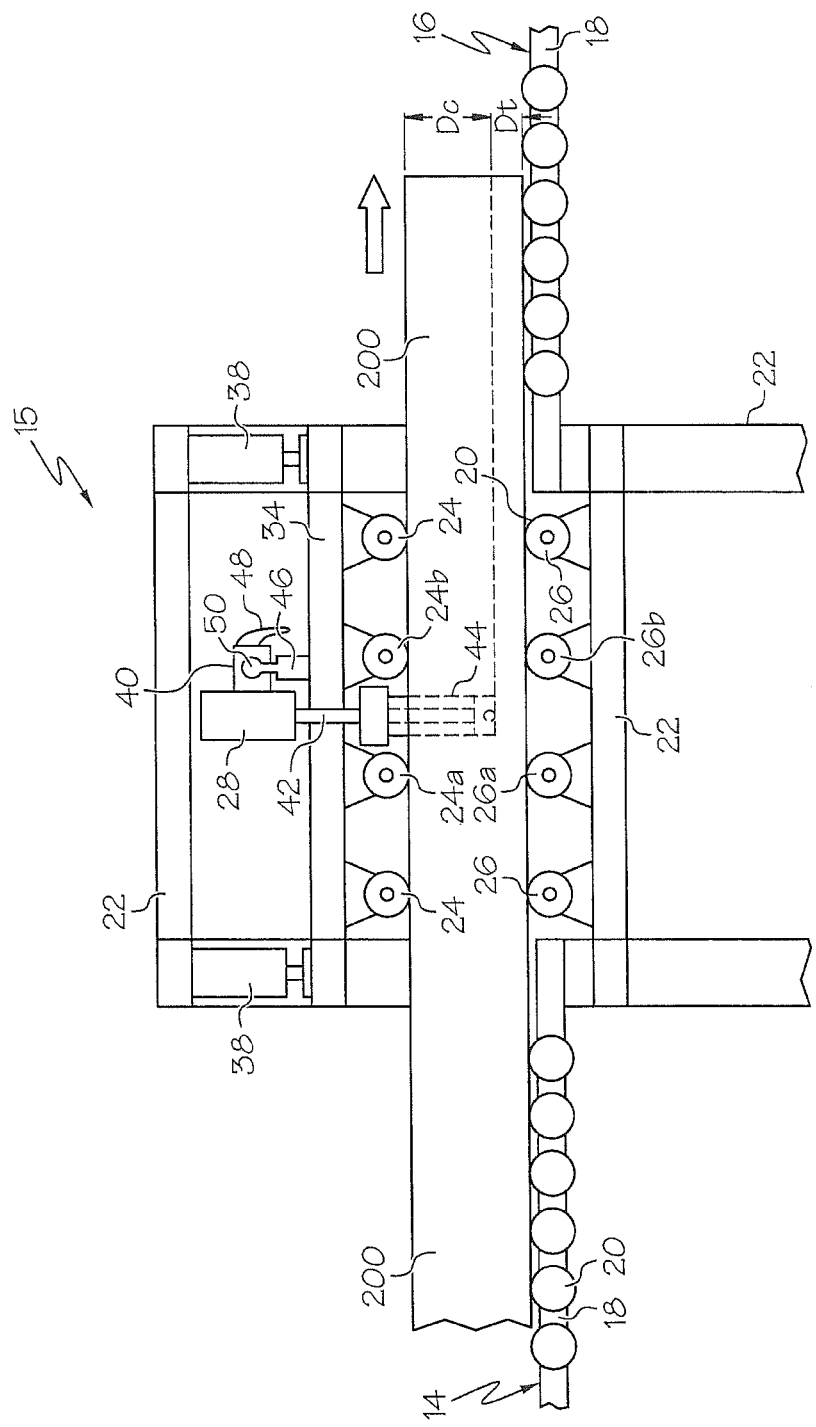
FIG. 4 is a partial section view of the cutting machine of FIG. 3, taken generally along the line 4-4 in the direction of the arrows.
Figure 5:
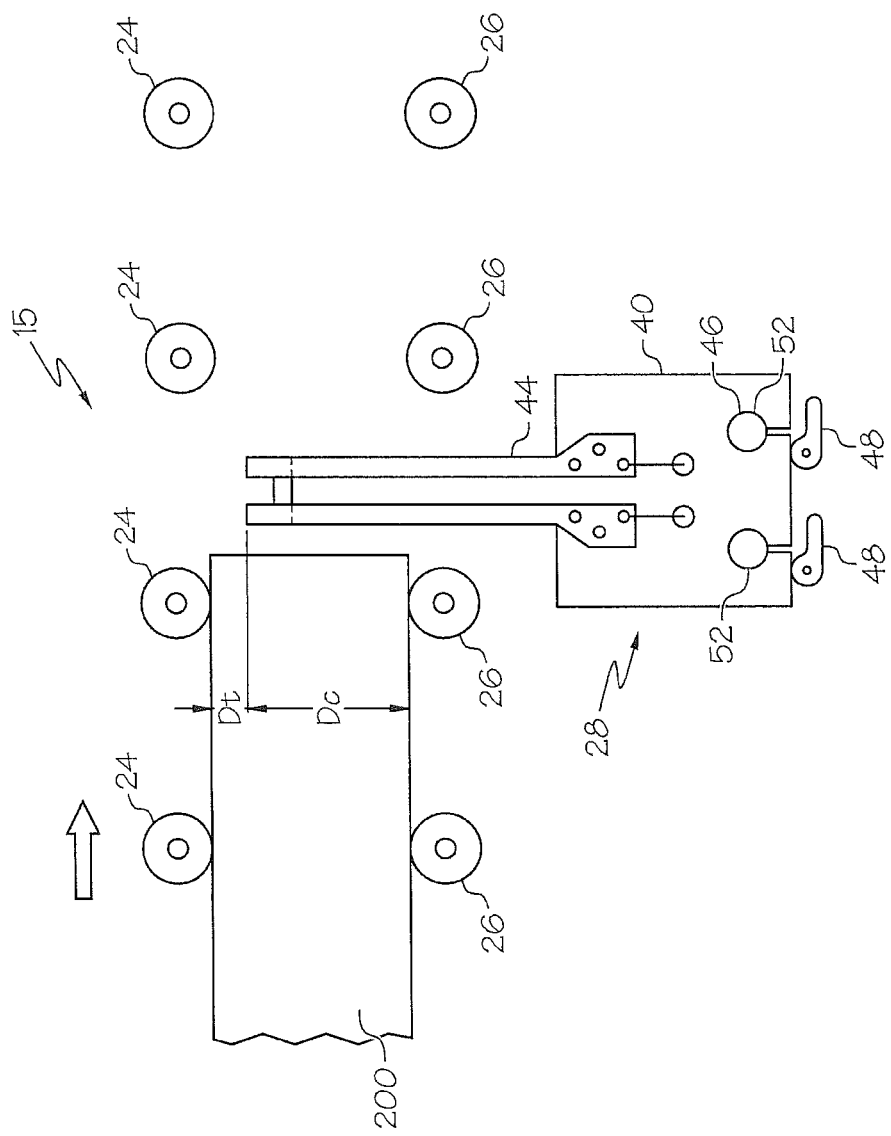
FIG. 5 is a schematic side view of the upper feed rollers, the lower feed rollers and a hot knife positioned within the rollers of the foam panel cutting unit in accordance with one embodiment of the present invention.

As shown in FIGS. 3, 4 and 5, hot knife 28 can be positioned on the frame vertically to extend within the gap 36 formed between the upper and lower rollers 24 and 26. The embodiment shown in FIGS. 3 and 4 provides each hot knife 28 comprising a body 40 which includes circuitry and a linear motion actuator 42 operable to raise and lower blade 44 of hot knife 28. Actuator 42 may extend between a retracted position and an extended position wherein the end of blade 44 can be positioned in a desired location to provide a desired cut depth $D_c$ at an extended position and can be retracted such that it will not engage foam panel 200 as it passes through cutting machine 10. One embodiment of cutting unit 15 provides kerf/slot 211 having a cut depth $D_c$ and a thermal barrier depth $D_t$. Thermal barrier depth $D_t$ comprises an uninterrupted foam portion of the foam panel on an exterior face of each insulating building panel 201. In one embodiment, the thermal barrier depth $D_t$ may be around 1½" thick. However, any other thermal barrier depth $D_t$ can be provided using cutting unit 15 as necessary to meet certain building codes or other designer desired performance metric. In one embodiment, each hot knife 28 may have its own actuator 42 so that an operator can select whether each hot knives is to be lowered to engage to cut slots/kerfs 211 in the foam panel 200. This feature is particularly advantageous when wider stud spacing S is provided and less hot knives are needed.

Actuators 42 allow for blades 44 to be lowered to a position to cut slots/kerfs 211 in the foam panel 200 prior to feeding the panel through. In addition, actuators 42 can be used to lower and raise blades 44 of hot knives 28 while the foam panel 200 travels through cutting unit 15 to cut window and/or door openings as desired. Alternatively, FIG. 5 illustrates an embodiment wherein the hot knife 28 is mounted below lower rollers 26 so that the heat generated in blade 44 of hot knife 28 does not build-up on the actuator, circuitry and other controls. FIG. 5 shows another embodiment of a hot-knife 28 without an actuator. Blades 44 may come in various sizes and may be interchangeable such that a different blade 44 can be utilized for each nominal foam panel thickness to cut slots/kerfs 211 in each foam panel for the proper cutting depth $D_c$ and thermal barrier depth $D_t$. Since most panels for any given project will often be the same thickness, a blade 44 having the desired length may be installed at the beginning of a project and subsequently changed for other project or panel thickness or as otherwise desired. The embodiment of FIG. 5 may also include an additional hot knife 28 configured to cut window or door openings in building panel 201. In any embodiment, the window or door openings may be cut into the panel 200 manually.

As shown in FIGS. 3, 4 and 5, hot knife housing 40 may be mounted on a guide rail 46 wherein the lateral position to spacing "S" and each hot knife 28 may be adjusted to cut profiles at the conventional 16" to 24" on-center position or any other desired stud spacing S. FIGS. 3 and 4 show an embodiment wherein the guide rail is a single rail 50 that has a shape which prohibits rotation of the housing 40 of hot knife 48. FIG. 5 shows an embodiment wherein housing 40 is mounted upon two circular rods 52 which provide a similar prevention of rotation of the hot knife 28. Lateral adjustment may be performed manually wherein the position of each hot knife is fixed using a clamping device 48. Any clamping device 48 now known or hereafter developed may be used to fix the position of each hot knife, for example, a cam-type clamp is shown in FIGS. 4 and 5. An embodiment of a cutting unit of the present cutting machine (not shown) may also include motorized lateral adjustment wherein the lateral position of hot knife 28 is facilitated using a servo motor or other motor now-known or hereafter developed to cause the lateral motion and positioning of hot knife 28.

An embodiment of cutting unit 15 may also be configured to cut door and window cuts on a single pass. At least one hot knife (not shown) may be positioned before, after, or in-line with the row of hot knives 28 shown. The at least one hot knife is configured to have both lateral movement and downward motion capabilities and is operable to be selectively deployed downward and in a lateral motion to cut window or door openings. The engagement of these hot knives may be complimentary to the drive speed of the rollers to allow for the rollers to stop feeding foam panel 200 through cutting unit 15 thereby allowing a transverse cut to be made in the foam panel 200.

FIG. 4 illustrates one embodiment of cutting unit 15 including four upper rollers 24 and four lower rollers 26 with hot knife 28 being disposed between the second and third upper and lower rollers 24a and 24b and 26a and 26b. This configuration allows cutting unit 15 to provide support on both the top surface 220 and bottom surface 222 of foam panel 200 while it passes through cutting unit 15. However, hot knife 28 can alternatively be positioned before, after or in-between any of the upper or lower rollers 24 and 26.

Figure 6:
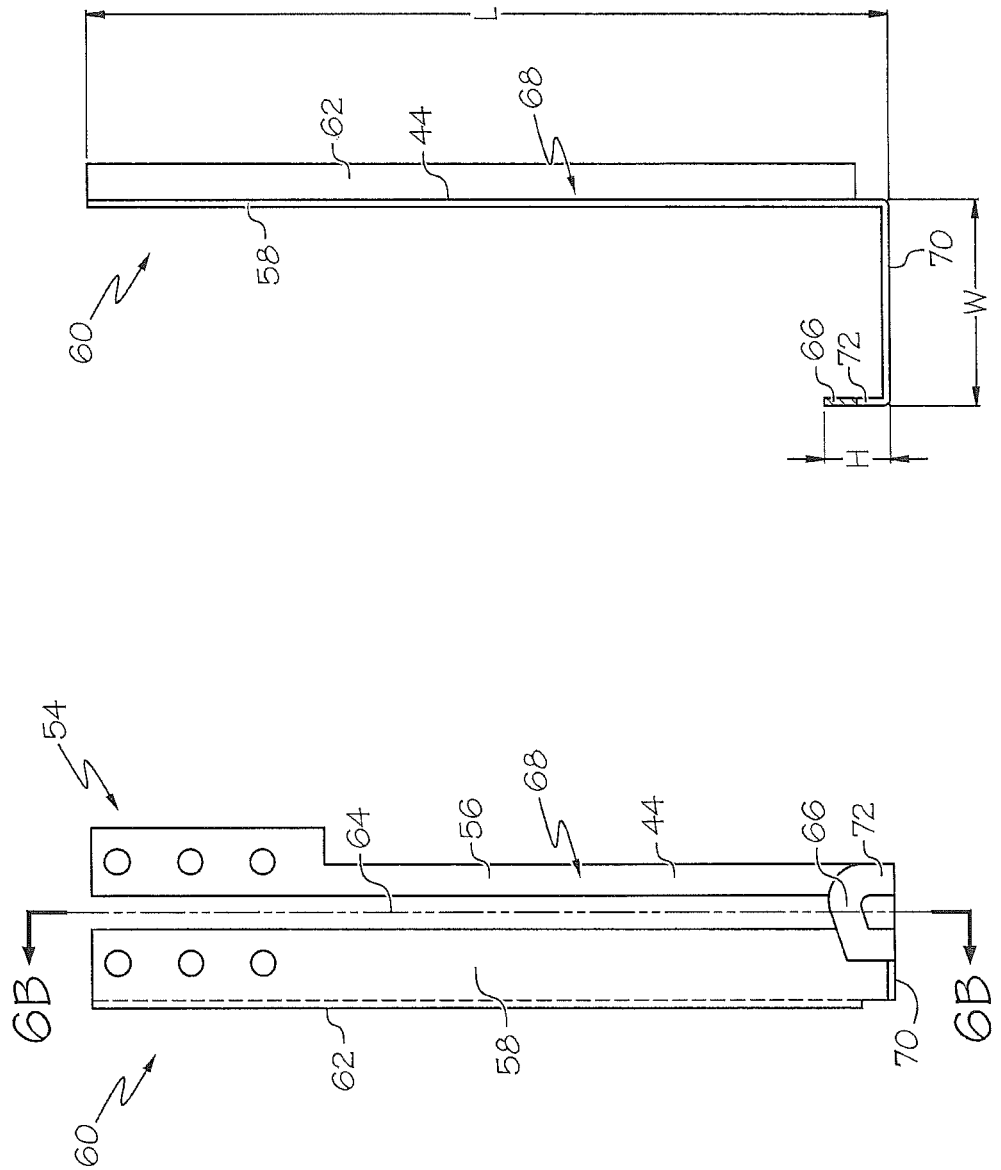
FIG. 6A is a front view of a blade of a hot knife in accordance with one embodiment of the present invention.
FIG. 6B is a side view of the blade of FIG. 6A.

FIGS. 6A and 6B show blade 44 in more detail. As stated above, blade 44 is preferably electrically heated. When electrical heat is used, blade acts as a circuit. Such circuit is comprised of anode 54, cutter 56, heat sink 58, and cathode 60. The shape of blade 44 is critical in providing superior cutting properties over hot wire cutters of the prior art because the shape of blade 44 dictates the way in which each element of the circuit performs. During operation of the present cutting machine 10, electrical current flows into anode 54 and through cutter 56. As seen in the drawing, cutter 56 is comprised of a relatively long, thin, and flat piece of conductive material. Heat sink 58 is comprised of a length of material that is approximately the same length as cutter 56. However, heat sink 58 is considerably wider, and may preferably be somewhat thicker than cutter 56. Further, to increase both the stiffness of blade 44 and the cross-sectional area of heat sink 58, blade 44 may comprise a stiffening return 62 coupled and substantially perpendicular to heat sink 58. Stiffening return 62 may be a width of bent heat sink or may be otherwise coupled to heat sink 58, such as through a weld. An electrical insulator 64, which can be a ceramic or a non-conducting gas such as air in the gap (as shown), separates cutter 56 and heat sink 58 at all points except for a bridge 66 electronically connecting cutter 56 and heat sink 58.

The thickness and width of cutter 56 dictates that when current flows through cutter 56, cutter 56 heats to a relatively uniform temperature because the cross section of the conductive material remains substantially the same throughout the length of cutter 56. A uniform temperature can be maintained with this configuration because cutter 56 yields uniform resistance. After an electrical current exits cutter 56 and enters heat sink 58 through bridge 66 wherein bridge 66 may have substantially the same cross sectional area as cutter 56, the cross section of conductive material comprising heat sink 58 increases. The increase in cross sectional area between heat sink 58 and cutter 56 means that the electronic resistance of heat sink 58 is lower than cutter 56 which results in cutter 56 having a temperature that is higher than the temperature of heat sink 58. The advantages of this configuration wherein heat sink 58 has less electronic resistance are at least twofold: first, heat sink 58 provides a higher bandwidth for current than cutter 56, which assists in maintaining uniform current and thus even temperature throughout cutter 56; second, because heat sink 58 is thicker and remains at a lower temperature than cutter 56, it remains more rigid than cutter 56 and the added thickness and rigidity of heat sink 58 assists in forming the proper shape of kerf 211 consistently. After heating cutter 56 and heat sink 58, the electrical current flows from heat sink 58 through cathode 60 and out of blade 44 to complete the circuit.

Depending on the temperature of cutter 56, kerf 211 is formed by vaporizing or melting a portion of foam panel 200 around blade 44. During such process, at least a portion of the foam surrounding kerf 211 remains melted after foam panel 200 passes through blade 44. Heat sink 58 may operate to cool such melted foam, which additionally assists in forming the proper shape of kerf 211.

Various conductive materials may be used to construct blades 44. A material with high resistivity is desired to result in a small, thin blade 44 capable of reaching higher temperatures to melt or vaporize the foam. Resistivity values of conductive metals change with temperature. The best mode known to the inventors is to construct blades 44 from Nichrome metal because Nichrome has a relatively high resistivity of $100 \times 10^{-8} \Omega \cdot m$ at 20° C., yet a relatively low temperature coefficient of 0.0004 (as compared with other readily available metals). The operating temperature of cutter 56 of cutting unit 15 is preferably in a range between about 700° F. to about 1200° F. (370° C. to 650° C.). The operating temperature of heat sink 58 is preferably in a range between about 250° F. to about 500° F. (120° C. to 260° C.). Other operable temperature ranges may be obtained by adjusting the thickness and width of cutter 56 and/or heat sink 58 or the properties of the current flowing there through and are within the scope of the present invention. The temperature of cutter 56 may be varied to adjust the width of the kerf 211. Generally speaking, the higher the temperature, the wider the cut as the blade melts more of the foam panel 200 adjacent to cutter 56. In one embodiment, a micro-switch (not shown) is triggered by a foam panel 200 which increases the voltage passing through the blade 44 and, therefore, increases the temperature of the hot knives to accommodate and compensate for the cooling effect of the moving material on stationary cutting blade 44 as foam panel 200 moves through the present cutting machine 10. In this embodiment, when foam panel 200 exits cutting unit 15, the micro-switch is no longer made thereby switching the blade 44 temperature back to a lower setting. This feature can help prevent the Nichrome blades 44 from melting due to overheating between the foam panels 200 being fed through cutting unit 15.

In one embodiment, the ratio in the relative resistance between the cutter 56 and the heat sink 58 is preferably between 3:1 and 4:1, with ratios in the desired temperature range being between about 3.37:1 and 3.51:1. The ratio of resistance is effective in ensuring that cutter 56 remains at the proper operating temperature during operation of cutting unit 15. Nichrome is a preferred material as the resistivity of the metal does not change greatly within the preferred operation temperature range. U.S. patent application Ser. No. 12/218,678 includes a chart summarizing the resistivity of various embodiments of the cutter 56 and heat sink 58.

As shown in FIGS. 6A and 6B, blades 44 may have an "L" or a "J" shape wherein cutter 56 and heat sink 58 are shaped to have a long side 68, a bottom side 70, the bottom side 70 extending substantially perpendicular to the end of long side 68. A stiffening return 72 may also be utilized to stiffen blade 44 wherein stiffening return 72 may comprise a ninety-degree upward bend at one end of bottom width 70 opposite long side 68 as shown. Stiffening return 72 increases the rigidity and structural stability of the cutting edge. Stiffening return 72 also comprises part of the cutting surface and will result in a cut that has a "J" shape. Bridge 66 may connect the stiffening return portions of cutter 56 and heat sink 58 as shown thereby providing the current bridge between cutter 56 and heat sink 58. The dimensions of long side 68, bottom side 70 and stiffening return may be selected by a person of skill in the art to substantially match the flange configuration of the metal stud 207 being used in building panel 201. These dimensions are provided by each metal stud manufacturer and blades 44 may be easily configured to substantially match such dimensions as obtained.

The cross-sectional area of cutter 56 and heat sink 58 may also be selected based upon the size and shape of metal studs 207 to be used. Studs 207 for use in building construction are commonly in the range of 14 to 24 gauge (0.0785 to 0.0276 inches), although sheet metal used in studs 207 can range from 3 to 30 gauge or beyond (0.2391 inches to 0.0100 inches). For example, studs 207 constructed from 20 gauge galvanized steel have a thickness of 0.0396 inches (1.01 mm). When using 20 gauge galvanized steel, a blade 44 having a thickness of 0.0400 inches (1.02 mm) may be utilized to create kerf 211. A person of skill in the art will appreciate that the thickness of the cutter 56 and heat sink 58 should cut a slot/kerf 211 that has a sufficient width 224 (shown in FIG.

1B) to allow the insertion of a metal stud 207 and that the thickness of cutter 56 and blade 58 may be selected based upon the gauge and cross-section dimensions of metal stud 207 being incorporated into building panel 201. As described above, the thickness of the slot/kerf 211 can be adjusted by using one or more variables, for example, including: (1) the speed at which foam panel 200 is fed through cutting unit 15, (2) the temperature of cutter 56, and/or (3) the material thickness of cutter 56.

One embodiment of cutter 56 has a length of 7.03 inches (176 mm) and a width of 0.240 inches (6.10 mm), and one embodiment of heat sink 58 has a length of 6.64 inches (169 mm) and a width of 0.710 inches (18.0 mm) However, a person of skill in the art will appreciate that the length of the long side 68 of cutter 56 and heat sink 58 may be selected based upon the thickness of the foam panel 200, cut depth $D_c$, and thermal barrier depth $D_t$ and, therefore, longer or shorter lengths are within the scope of the present invention.

Figure 7:
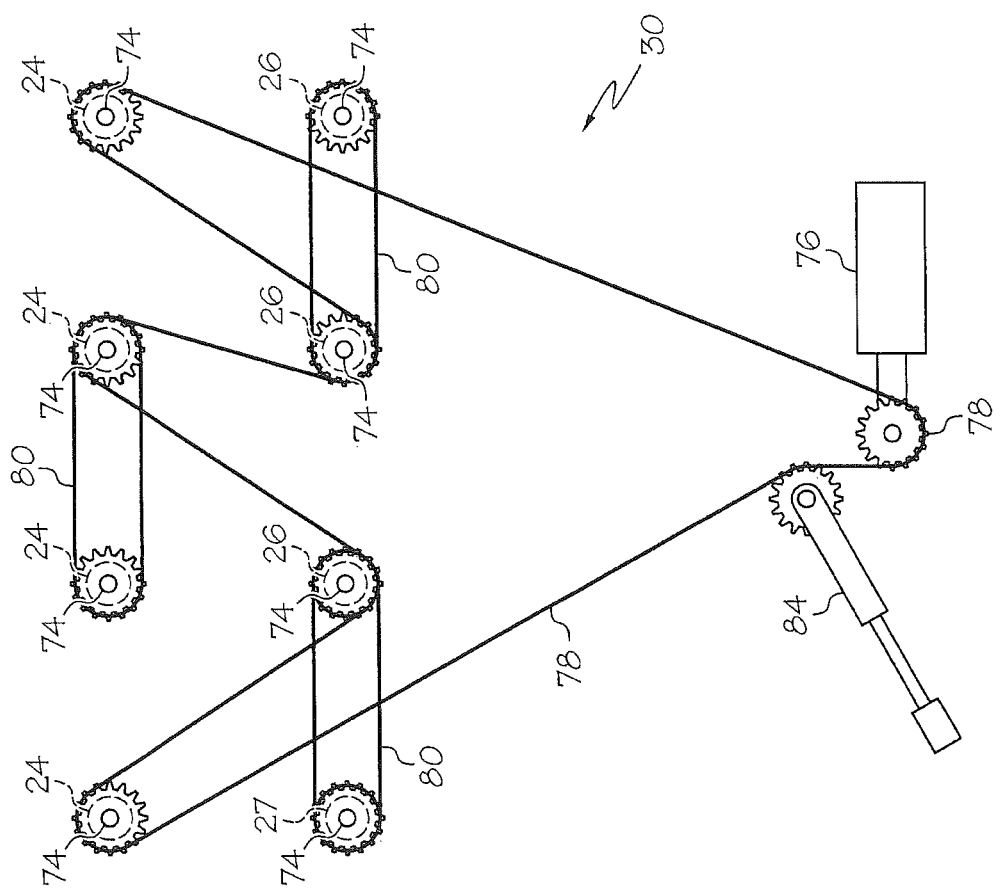
FIG. 7 is a schematic diagram of the upper and lower rollers and a drive system the foam panel cutting unit in accordance with one embodiment of the present invention.

As shown in FIG. 7, an embodiment of drive system 30 may engage one or more pulleys/gears 74 disposed on an end of upper and lower rollers 24 and 26. One embodiment of drive system 30 is configured to drive upper and lower rollers at identical speed. Thus, drive system 30 comprises a single variable speed motor 76, a serpentine belt/chain 78, and it may include one or more auxiliary transmission belt/chains 80. Motor 76 may be a single or bi-directional, single or variable speed motor. Motor 76 may be electric or fuel powered, or any other motor now known or hereafter developed. Motor 76 is preferably mounted to frame 22. It is preferred that pulleys/gears 74 will have the same diameter so as to ensure that the rate of rotation of each roller 24 and 26 is the same. Serpentine belt/chain 78 and auxiliary belt/chain 80 will be selected to be complementary to the pulley/gear 74 as within the skill of a person of skill in the art. A belt or chain tensioner 84 may be utilized to tension the serpentine belt/chain 78 as adjustable head 34 moves up and down to adjust the position of upper rollers 24. Auxiliary transmission belt/chains 80 may span between adjacent rollers 24 or 26 to transfer the drive force from the roller driven by the serpentine belt 78 to another adjacent roller. The auxiliary transmission belt/chain 80 may provide a drive power to the roller if desired. Alternatively one or more rollers 24 and 26 may be simply be mounted on a bearing for free rotation and provide vertical support of the panel 200 while it is traversing through cutting machine 10. One embodiment includes a nominal speed of around 1.5 to 2.0 inches per second, although, the present cutting machine may be configured to operate at any speed that produces the desired slot dimension and pattern. The width of the bottom of the stud profile cut into the foam panel 200 is determined by the drive speed. For a larger width, a slow speed is maintained, and for a narrower width, the drive speed up on the main control is increased.

A person of skill in the art will appreciate that in addition to the embodiment described herein, that the drive system of cutting machine 10 may be configured in a number of various ways now known to feed foam panels 200 through cutting unit 15. For example, for foam panels having shorter lengths may be driven through cutting unit 15 by a hydraulic arm (not shown) that includes a ledge which engages the end of the foam panel and pushes it through blades 44. Hydraulic arm (not shown) can be operably connected to entry feeder platform 14. Another embodiment (not shown) could include one or more winches operably connected to the exit platform 16 wherein a steel or fiber cable or rope can be fed through cutting unit 15 between blades 44 wherein the free end of the steel or fiber rope or cable may include a bracket configured to engage the far end of foam panel 200. The winch may then be engaged to wind the cable/rope to pull foam panel 200 through blades 44 of cutting unit 15.

Figure 8:
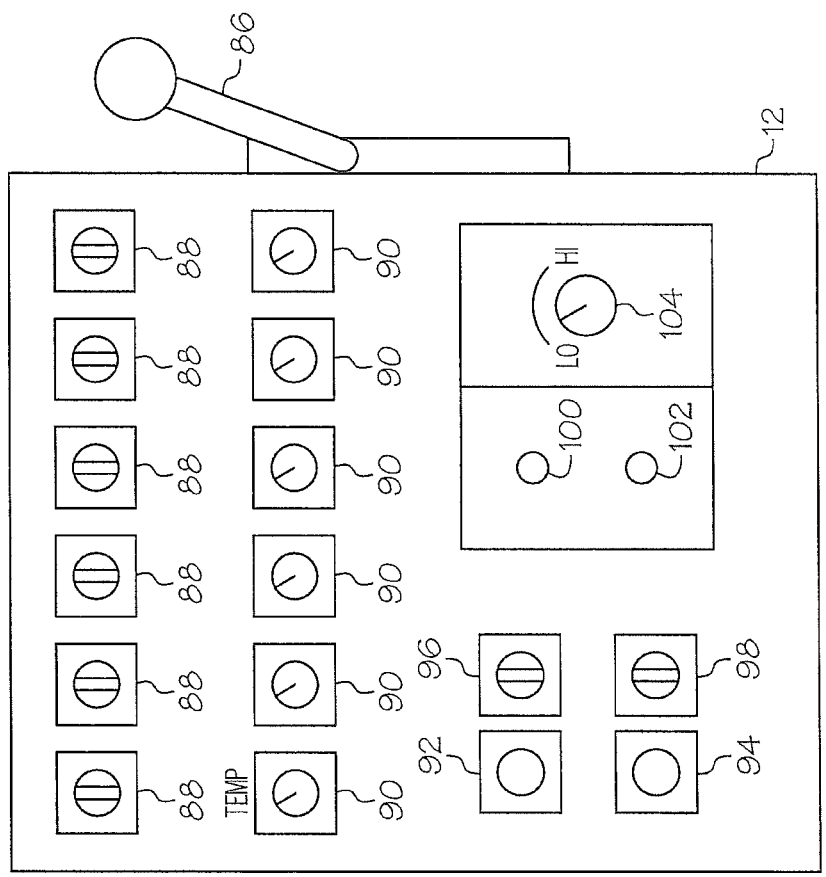
FIG. 8 is a schematic diagram of a control panel of the foam panel cutting unit in accordance with one embodiment of the present invention.

FIG. 8 illustrates one embodiment of control panel 12 of cutting unit 15. As shown, the control panel may include a main on/off switch 86, a knife control switch 88 for each hot knife 28, a temperature dial 90 for each blade 44, a roller start button 92, a roller stop button 94, a roller direction switch 96, an auxiliary feature switch 98, a status indicator light for the power on 100, a status indicator light 102 for the blade a proper temperature, and a roller speed dial 104. Knife control switch 88 may be a multiple position switch that has a position for off, a second position that activates actuator 42 to lower or raise the blade 44, and a third position to initiate current flow through blade 44. In one embodiment, each hot knife 28 includes its own individual switch 88 as shown. However, one switch may also control one or more hot-knives 28. When the hot knife switch 88 is in a "heat" position to initiate current through blade 44, a temperature dial 90 can be adjusted to set the operating temperature of blade 44. Again, a temperature dial 90 may be present for each hot-knife 28, or alternatively, a temperature dial may adjust the temperature for more than one blade 44. The roller start button 92 or switch turns on motor 76 of drive system 30 to drive the motors. Direction switch 96 controls whether the motor drives the rollers to feed foam panel 200 forward or backward. Roller stop button 94 then can be pressed to stop the rollers and turn off motor 76. If motor 76 is a variable speed motor, roller speed dial 104 may be used to increase or decrease the output speed of motor 76 and, thereby, the speed of the rollers 24 and 16. Indicator lights may be provided for machine "on" 100 and another light 102 indicating that the blades are hot or have pre-heated. Auxiliary switch 98 may control lights and/or a vacuum or air system to circulate air through cutting unit 15.

In use, an operator will "power on" one embodiment of the present cutting machine 10 by placing main switch 86 in the "on" position. This "power on" feature may turn on an air compressor or hydraulic pump that power any actuators, motors, or other controls. An operator will set the operating parameters for the present cutting machine 10 by adjusting the spacing S between blades 44 of hot knives 28 to match the metal stud 207 spacing S for the designed building panel 201. The operator will also adjust the position of adjustable head 34 to match the thickness of foam panel 200. The operator may use a tape measure or pre-measured thickness gauge (not shown) disposed on the frame of the machine to determine the thickness. The operator lowers and turns on the hot knifes 28 that will be used to cut slots/kerfs 211. A heat indicator light 102 may either (1) indicate current through the blades and the blades are hot, and/or (2) that the blades have preheated to the desired operating temperature. The operating temperature of each blade 44 may be adjusted by adjusting one or more dials 90. The operator will the turn on the rollers 24 and 26 by pushing the "on" button 92 and the user will adjust the direction of the rollers by adjusting switch 96. The speed of the rollers may be adjusted by adjusting roller speed dial 104. Next, the user may insert a leading end of foam panel into cutting unit 15 wherein the rollers 24 and 26 feed foam panel 200 through blades 44 of hot knives 28 at the operating speed which cuts a "L" or "J" shaped cut through the continuous length of foam. As discussed above, a microswitch may be configured to be engaged when foam panel 200 is passing through blades 44 to raise the temperature of blades 44 while the foam panel 200 is being fed through cutting unit 15. Metal studs 207, or a portion of the web and a flange thereof may then be inserted into the slots/kerf 211 either manually or by another automated piece of equipment in series with the present cutting machine 10 to construct an insulated building panel 201.

The present cutting machine 10 is unique in that a foam panel of any length can be passed through blade 44 and, thus, once a foam panel 200 is introduced into the present cutting machine 10, rollers 24 and 26 driven by motor 76 continuously feed the sheet 200 through the cutting unit. The roller feed may be stopped at any time to cut a horizontal cut as described above for a window or door opening.

Once all the sheets are cut that are desired to cut, the machine may be shut down until the next use. The hot knife controls are positioned in the "off" position, the rollers are turned off, and the main power switch may also be turned off.

As is evident from the foregoing description, certain aspects of the present invention are not limited to the particular details of the examples illustrated herein. It is therefore contemplated that other modifications and applications using other similar or related features or techniques will occur to those skilled in the art. It is accordingly intended that all such modifications, variations, and other uses and applications which do not depart from the spirit and scope of the present invention are deemed to be covered by the present invention.

Other aspects, objects, and advantages of the present invention can be obtained from a study of the drawings, the disclosures, and the appended claims.

I claim:

1. A method for cutting kerfs into a foam panel as a step in constructing an insulated building panel, the method comprising:
    adjusting position of at least one upper roller relative to at least one lower roller to define a gap distance between said at least one upper roller and said at least one lower roller;
    fixing a position of a plurality of hot knives, said hot knives each having a blade;
    heating said blade of said hot knives; and
    feeding a foam panel through said blades of said hot knives.
2. The method of claim 1 further comprising:
    rotating one or both of said at least one upper roller and at least one lower roller using a drive system; and
    introducing said foam panel to said upper and lower rollers.

* * * * *